Figure 1:
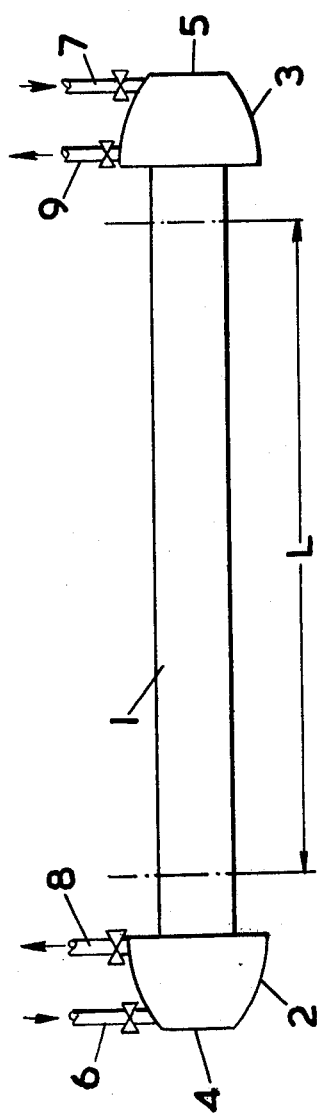

United States Patent [19]
Hayward

[11] 3,978,708
[45] Sept. 7, 1976

[54] MEMBERS MOVING WITHIN TUBES

[75] Inventor: Alan Thomas Joseph Hayward, Glasgow, Scotland

[73] Assignee: The Secretary of State for Industry in Her Britannic Majesty's Government of the United Kingdom of Great Britain and Northern Ireland, London, England

[22] Filed: June 10, 1975

[21] Appl. No.: 585,521

[30] Foreign Application Priority Data
June 12, 1974 United Kingdom............. 26172/74

[52] U.S. Cl.............................. 73/3; 15/104.06 A
[51] Int. Cl.² ........................................ G01F 25/00
[58] Field of Search... 73/3; 15/104.06 A, 104.06 B; 137/268

[56] References Cited
UNITED STATES PATENTS

| | | | |
|---|---|---|---|
| 2,371,243 | 3/1945 | Jordan | 73/3 |
| 2,755,742 | 7/1956 | Vincent | 15/104.06 A |
| 2,786,219 | 3/1957 | Meyer | 15/104.06 A |
| 3,100,308 | 8/1963 | DeSena | 15/104.06 A |
| 3,158,888 | 12/1964 | Ericson | 137/268 X |
| 3,174,171 | 3/1965 | McDermon | 15/104.06 A |
| 3,580,045 | 5/1971 | Pfrehm | 73/3 |
| 3,605,790 | 9/1971 | Hunter | 137/268 |

Primary Examiner—Herbert Goldstein
Assistant Examiner—Daniel M. Yasich
Attorney, Agent, or Firm—Cameron, Kerkam, Sutton, Stowell & Stowell

[57] ABSTRACT

An arrester for a discrete body being transported through a closely fitting pipeline by liquid flow, consisting of a final length of pipe with enlarged bore which gradually tapers to a minimum cross section at its closeable end. When the end is closed, a discrete body carried axially into this enlarged bore is decelerated by the action of liquid in the end bore being forced back past the body. Suitable shaping of the taper governs the rate of deceleration.

The invention is particularly applicable to the arrestment of displacement members used in flowmeter provers and provision has also been made for launching an arrested displacement member back into the prover pipe with an acceleration rate governed by a further region of enlarged bore but with reverse taper.

8 Claims, 4 Drawing Figures

MEMBERS MOVING WITHIN TUBES

This invention relates to the retardation and acceleration of discrete bodies transported by fluid flow through pipes. Such retardation and acceleration is necessary, for example, in flowmeter calibration on proving apparatus known as meter provers and in particular travelling displacement member meter provers which comprise essentially a length of pipe in which a displacement member forms an interference fit. Liquid is pumped through both the flowmeter to be calibrated and the length of pipe containing the displacement member, causing the displacement member to move with the liquid in the pipe. Switches located one each at the beginning and end of a calibrated length of the pipe are connected to a timer which is also linked with the flowmeter under test so that the flowmeter reading can be related to the time taken for the displacement member to traverse the calibrated length.

It is often necessary with travelling displacement member meter provers to provide some means for arresting the motion of the displacement member at the end of a test run along the calibrated length of pipe, particularly for high flow rates when the displacement member may be travelling at high speed. Various means for this purpose have been employed, for example, a spring-loaded buffer inserted within the pipe at the end of the pipe, but such means have proved inconvenient in use.

The present invention provides an alternative means for arresting the motion of a discrete body at the end of a closely fitting pipeline through which it is transported by fluid flow, comprising a length of pipe axially continuous with the end of said pipeline and having an enlarged bore, at least part of which has a cross sectional area which gradually decreases towards a closeable end remote from the pipeline, and one or more fluid transfer ports situated adjacent the region of maximum cross section. The said pipeline may, for example, constitute the calibrated length of the main pipe of a travelling displacement member meter prover.

With such an arrangement, liquid from the region between the displacement member and the closed end is forced back past the displacement member in the enlarged internal bore to arrest the motion of the displacement member. Generally means will be necessary to constrain the displacement member to move axially or centrally within the enlarged bore of the section of the pipe. Suitable means for constraining the displacement member to move axially or centrally include a plurality of longitudinal vanes extending from the inner surface of the enlarged internal bore of the section of the pipe towards the axis or centre of the pipe. Alternatively guide rods parallel to the pipe axis may be provided to centralise the movement of the displacement member within the enlarged bore of the pipe.

With spherical or spheroidal displacement members arranged to fit closely in a calibrated length of a cylindrical pipe, the enlarged bore will preferably have a circular cross section, tapering to a minimum diameter circular cross section at the closed end of the pipe.

The rate of deceleration of the displacement member is a function of the rate of decrease in the cross sectional area of the enlarged bore towards the closed end of the section at the end of the pipe. For a spherical displacement member in a cylindrical pipe, the cross sectional area of the clearance between the sphere and the inner surface of the enlarged bore of the pipe should preferably, for an ideal liquid, be proportional to the square root of the distance from the closed end of the section of the pipe in order to produce a uniform deceleration. The exact relationship preferred for real liquids and real meter prover systems may be determined by experiment. An acceptable approximation to uniform decleration may be conveniently achieved with a linearly decreasing taper.

In a bi-directional travelling displacement member meter prover alternate tests can be made with the displacement member travelling consecutively in each direction, in which case a section of the pipe having an enlarged bore may be located at each end of the pipe adjacent the respective end of the calibrated length of pipe.

Each enlarged end-bore has a region of gradually decreasing cross-section, tapering to a minimum at the closed end of the bore, in order to induce uniform deceleration of an arriving displacement member. Additionally, the deceleration region may be preceded by a region of reverse taper, i.e. a region of similarly decreasing cross-section but tapering backwards along the end-bore to a minimum diameter at the commencement of the end-bore, in order to induce uniform acceleration of the displacement member when it is launched back into the main pipe of the prover for measurement of flow in the other direction.

Figure 3:
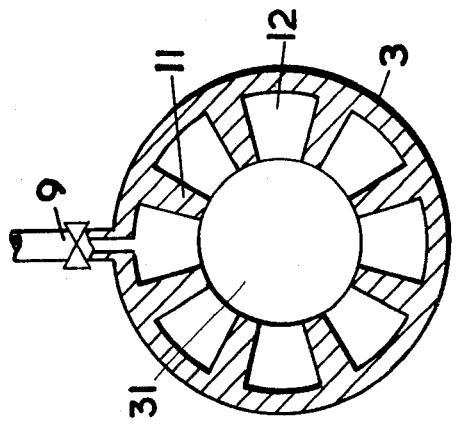
Figure 2:
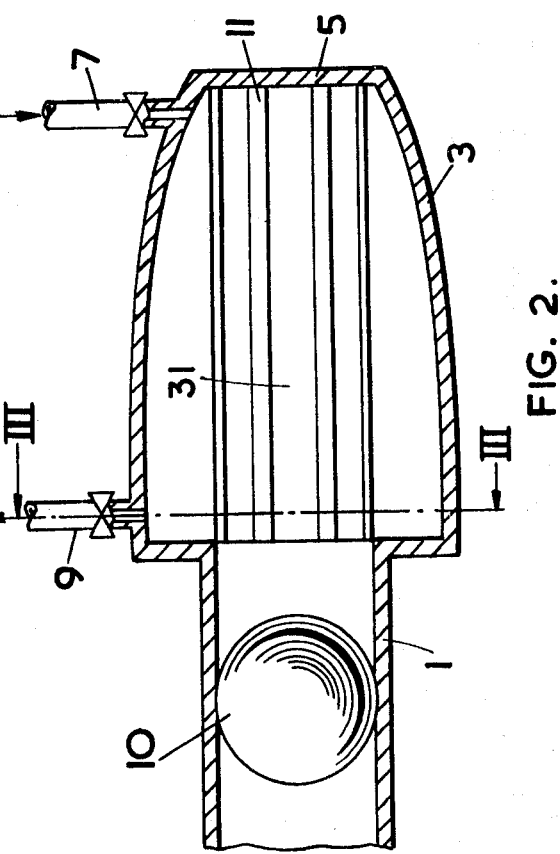
Figure 4:
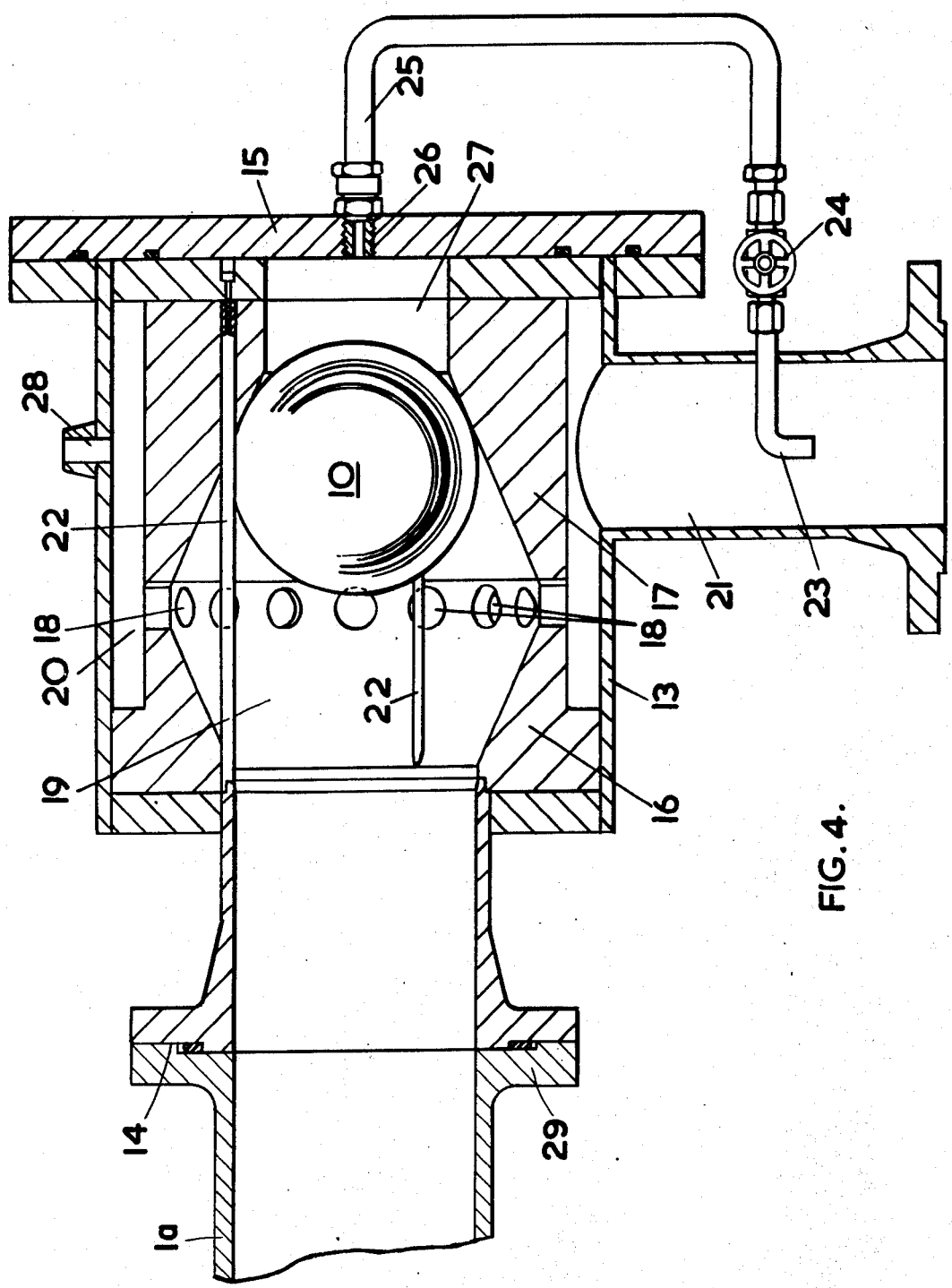

One example of a bi-directional travelling sphere meter prover according to the invention and suitable for use with liquids is illustrated in the accompanying drawings, of which:

FIG. 1 is an outline sketch of the main pipe of the meter prover with an end unit having an enlarged arrester bore attached at each end, FIG. 2 is an enlarged schematic sectional view of the right-hand end of the pipe and attached end unit illustrated in FIG. 1, FIG. 3 is a section on III—III of FIG. 2; and FIG. 4 is a longitudinal cross-section of a meter prover end unit having both an arrester bore and a launcher bore.

The bi-directional travelling sphere prover incorporates a system of valves and inter-connecting ancillary pipes (not illustrated), examples of which are well known in the art, such that although the liquid always passes through the meter under test in the same direction it can be made to travel in either direction through the main pipe of the meter prover.

The main pipe of the meter prover, as illustrated in FIG. 1, comprises a length of cylindrical pipe 1 having a calibrated length L which is attached at each end to axially aligned end units 2, 3, each unit having an internal chamber 31 (FIG. 2), the cross-sectional area of which tapers from a maximum diameter, adjacent the pipe 1, which is greater than that of the pipe 1, to a minimum diameter at respective end closures 4, 5, which is less than that of the pipe 1.

Closeable inlets 6, 7 to the main pipe of the meter prover are located one each adjacent the respective end closures 4, 5 of the end units 2, 3, and closeable outlets 8, 9 are located one adjacent each end of the cylindrical pipe 1 in L and the respective end units 2, 3. The system of valves and inter-connecting pipes can be arranged to allow liquid to flow through the inlet 6 along the calibrated length L of the pipe from left to right (FIG. 1), and out via the outlet 9 inlet 7 and outlet 8 being closed, so that the displacement member will move from left to right along the calibrated length L, or can be arranged to allow the liquid to flow through inlet 7 and out via the outlet 8, inlet 6 and outlet 9 being closed, so that the displacement member will move in the opposite direction from right to left along the calibrated length.

The right-hand end of the main pipe of the meter prover (FIG. 1), and the attached end unit 3 having the internal chamber 31, inlet 7, outlet 9, and end closure 5 is illustrated in more detail in the enlarged drawings FIGS. 2 and 3.

In FIG. 2 a spherical displacement member 10 is shown approaching the end unit 3, the displacement member having completed a traverse of the calibrated length L from left to right. The sphere is constrained to move axially along the enlarged bore of the end unit 3 by means of a plurality of circumferentially spaced longitudinal vanes 11 extending radially from the inner surface of the end unit 3 of the pipe towards the axis of the end unit 3.

When, as illustrated in FIG. 2 and 3, the sphere 10 travels from left to right, the inlet 7 is closed, so that, as the sphere enters the end unit 3 and approaches the end closure 5, liquid in advance of the sphere is displaced by the movement of the sphere from left to right and is forced back through the space between the sphere 10 and the enlarged bore of the end unit 3 through parallel grooves 12 formed between adjacent vanes 11. A dash pot effect is therefore produced and pressure is built up on the right-hand side of the sphere causing it to decelerate.

The cross sectional area of the longitudinal grooves 12 and hence the area through which the liquid is forced back from right to left between the sphere 10 and the enlarged bore of the end unit 3 decreases as the sphere moves further towards the end closure 5 of the section 3. A suitable rate of deceleration of the sphere can be obtained by selection of a suitably tapered bore in the end unit 3. For an ideal liquid, and ignoring losses etc. in the meter prover, the sphere will decelerate uniformly if the cross sectional area of the grooves 12 is proportional to the square root of the distance from the end closure of the end unit 3.

In practice, it has been found that a linearly decreasing cross-sectional area is a sufficiently good approximation to the ideal shape to provide adequately uniform deceleration.

The molten of the sphere 10 can be arrested in the end unit 2 (FIG. 1) attached to the other, left-hand, end of the main pipe of the meter prover, in an exactly similar way to that described above in relation to the end unit 3 attached to the right-hand end of the main pipe of the meter prover.

A practical arrangement providing both deceleration and acceleration facilities is illustrated in FIG. 4, in which a bi-directional meter prover end unit consists of a housing 13 attached to a short pipe length 30, which pipe length is conveniently provided with a female pipe flange 14 that may be directly coupled to a male pipe flange 29 provided at the end section of a main prover pipe 1a. The housing 13 has a larger bore than that of the main prover pipe 1a and, for ease of assembly, is provided with a removable end-plate 15 through which the prover sphere 10, a launcher insert 16 and an arrester insert 17 may be entered. Both inserts 16 and 17 have conical bores, that of insert 16 converging towards the attachment flange 14 of the unit and that of insert 17 converging towards the end-plate 15 of the unit.

Three guide rods 22, each parallel with the longitudinal axis of the main prover pipe 1a and equally spaced around a circumference equal to that of the main prover pipe bore are provided within the region of enlarged bore defined by inserts 16 and 17, to constrain sphere 10 to move along the centre line of the unit.

Sixteen equi-spaced radial ports 18 are provided through insert 16 at a circle of greatest circumference, which ports provide liquid communication between inner bore 19 and an annular outer chamber 20 formed between the outer perimeter of inserts 16 and 17 and housing 13. A port 21 is provided in the outer wall of annular chamber 20 through which liquid may be admitted or removed according to the required direction of flow within the prover.

An additional port 28 is provided in the outer wall of chamber 20 which port is normally kept closed by a gate valve (not shown) but may be used for bleeding the system if and when required.

An outwardly facing pitot tube 23 is provided within port 21, the inner end of which tube is connected via a valve 24 and a flexible hose 25 to a port 26 in end-plate 15 to communicate with bore 19.

Operation of the system is as follows. When liquid is arranged to flow into the end-unit via the main power pipe 1a and to leave via port 21, the end-unit is required to act as an arrester for the prover sphere which will be transported into the end-unit with the liquid flow. Under this condition valve 24 is closed by the operator so that there is no liquid outlet from bore 19 via port 26. As the sphere enters the region of decreasing taper it is gradually decelerated by the action of liquid forced back past it by the pressure build-up in the closed end of bore 19 and it eventually comes to rest against insert 17 (as drawn) creating an end-chamber 27 between itself and end-plate 15. The operator then opens valve 24 and the suction generated in pitot tube 23 by the out-flow of liquid past it in port 21 acts to reduce the pressure of the fluid in end-chamber 27 below that of the fluid in bore 19, via port 26, hose 25 and valve 24 so that sphere 10 is held tightly against insert 17.

Valve 24 is then re-closed so that sphere 10 remains locked against insert 17 by the pressure differential existing across the sphere.

When it is desired to launch the sphere back along the prover pipe, the direction of liquid flow is reversed by adjusting the main valves of the meter prover (not shown) so that liquid enters the end-unit via port 21 and leaves via prover pipe 1a. After allowing sufficient time for uniform flow conditions to be reached, the operator opens valve 24. The pressure generated within pitot tube 23 by the in-flow of liquid through port 21 is then transmitted via valve 24, hose 25 and port 26 to end-chamber 27 to move sphere 10 away from its seat against insert 17.

As the sphere moves slowly away it is caught up by the inflowing liquid entering bore 19 via port 21 and ports 18 and is accelerated into the main prover pipe by the continuously increasing the fluid flow rate induced by the gradually narrowing clearance channel between the advancing sphere and the diminishing bore of insert 16.

An identical end-unit is also fitted to the other end of the meter prover pipe and the whole sequence of operation may be fully automated by the use of suitable timing and actuating circuits to operate the control valves (not shown).

I claim:

1. A device for arresting a discrete body transported through a closely fitting pipeline by fluid flow, comprising a housing adapted for fluid tight attachment to an open end of the pipeline and provided with an internal chamber for receiving and decelerating said discrete body, said chamber having an open end which communicates with the interior of the pipeline when the housing is connected thereto, a first portion of said chamber adjacent said open end being of a cross-section greater than that of the pipeline, and in which portion there is provided a first fluid transfer port through the wall of the housing, a second portion of said chamber adjacent said first portion having a tapering cross-section which reduces to less than that of the pipeline, said first and second portions being provided with a plurality of axially extending, radially spaced members for guiding the discrete body in movement substantially axially therein, and a closed end portion remote from said open end.

2. A device as claimed in claim 1 in which the dimensions of the tapered second portion of said chamber are selected to provide, with respect to a discrete body moving axially from the pipeline towards the closed end portion of said chamber, a clearance channel which decreases in accordance with a mathematical relationship in which the cross sectional area of the clearance channel at each transverse section is approximately proportional to the square root of the axial distance of that transverse section from the transverse section of smallest area within that channel.

3. A device as claimed in claim 1 including fluid pressure changing means communicating with the end portion of said chamber via a closeable second fluid transfer port through the wall of the housing.

4. A device as claimed in claim 3 in which the fluid pressure changing means comprises a pitot tube located within the first fluid transfer port and facing upstream to incoming fluid, said pitot tube being in disengageable hydraulic communication with the end portion of said chamber via the closeable second fluid transfer port, whereby, when the end portion of said chamber is closed-off from the preceding portions by a discrete body lodged in the tapering second portion and the second port is open, pressure within the end portion will be reduced and increased by fluid outflow and inflow, respectively, through the first fluid transfer port to hold the discrete body in the tapering second portion, and to force the discrete body out of the tapering second portion, respectively.

5. A device as claimed in claim 1 in which said axially spaced member consists of a plurality of guide rods longitudinally mounted within the first and second portions of said chamber and equidistant from the axis of the chamber.

6. A device as claimed in claim 1 having reversed-flow intensifying means for accelerating a discrete body launched from the internal chamber into the attached pipeline, said means comprising a region of tapering cross-section within the first portion of said chamber, which cross-section decreases from a maximum adjacent the second portion of said chamber to a minimum adjacent the pipeline, said minimum cross-section being approximately equal to that of the interior of the pipeline, and the first fluid transfer port being located adjacent the maximum cross-section of the first portion of said chamber.

7. A device as claimed in claim 6 in which the dimensions of the tapered region within the first portion of said chamber are selected to provide, with respect to a discrete body moving axially from the second portion of said chamber towards the pipeline, a clearance channel which decreases in accordance with a mathematical relationship in which the cross sectional area of the clearance channel at each transverse section is approximately proportional to the square root of the axial distance of that transverse section from the transverse section of smallest area within that channel.

8. A device as claimed in claim 6 for arresting and launching a discrete body of circular maximum transverse cross section in which the housing comprises a first length of pipe of internal bore equal to that of the pipeline, having a front end flange removably attachable to a flanged end of the pipeline, and a second length of pipe of oversize bore attached to the remote end of the first length of pipe, which second length is provided with a removable end plate through which at least one tubular insert is enterable, said insert being internally shaped to provide the said first, second and end portions of the internal chamber and externally shaped to provide an annular chamber between the external wall of the insert and the internal wall of the housing, which annular chamber provides fluid communication between a single fluid transfer port through the wall of the second length of pipe and the internal chamber via a plurality of symmetrically disposed radial fluid transfer ports through the insert adjacent the maximum cross section of said internal chamber.

* * * * *

UNITED STATES PATENT OFFICE
CERTIFICATE OF CORRECTION

Patent No. 3,978,708    Dated Sept. 7, 1976

Inventor(s) Alan Thomas Joseph Hayward

It is certified that error appears in the above-identified patent and that said Letters Patent are hereby corrected as shown below:

Column 2, line 67, after "9" insert a comma (,); column 3, line 49, "molten" should read --motion--; column 4, line 27, "power" should read --prover--, line 62, "the fluid" should read --fluid--; column 6, line 4, "member consists" should read --members consist--.

Signed and Sealed this

Twenty-second Day of February 1977

[SEAL]

Attest:

RUTH C. MASON
Attesting Officer

C. MARSHALL DANN
Commissioner of Patents and Trademarks